(12) United States Patent
Hu et al.

(10) Patent No.: US 11,003,064 B2
(45) Date of Patent: May 11, 2021

(54) DISPLAY SYSTEM AND METHOD

(71) Applicant: APPOTRONICS CORPORATION LIMITED, Shenzhen (CN)

(72) Inventors: Fei Hu, Shenzhen (CN); Zuqiang Guo, Shenzhen (CN); Yi Li, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 182 days.

(21) Appl. No.: 16/314,899

(22) PCT Filed: Apr. 28, 2017

(86) PCT No.: PCT/CN2017/082409
§ 371 (c)(1),
(2) Date: Jan. 3, 2019

(87) PCT Pub. No.: WO2018/006638
PCT Pub. Date: Jan. 11, 2018

(65) Prior Publication Data
US 2019/0155137 A1 May 23, 2019

(30) Foreign Application Priority Data
Jul. 4, 2016 (CN) .......................... 201610519561.1

(51) Int. Cl.
G03B 21/20 (2006.01)
G03B 21/00 (2006.01)
G03B 21/14 (2006.01)

(52) U.S. Cl.
CPC ......... *G03B 21/208* (2013.01); *G03B 21/005* (2013.01); *G03B 21/147* (2013.01);
(Continued)

(58) Field of Classification Search
CPC .. G03B 21/208; G03B 21/005; G03B 21/147; G03B 21/20; G03B 21/2013; G03B 21/2033; G03B 21/2066
(Continued)

(56) References Cited

U.S. PATENT DOCUMENTS

| 7,551,341 | B1 | 6/2009 | Ward et al. | |
| 2003/0202259 | A1* | 10/2003 | Nishimae | G02B 26/0816 359/726 |

(Continued)

FOREIGN PATENT DOCUMENTS

| CN | 1383034 A | 12/2002 |
| CN | 1847975 A | 10/2006 |

(Continued)

OTHER PUBLICATIONS

Extended European Search Report for Application No. EP 17823450.6 dated Feb. 12, 2020.

(Continued)

*Primary Examiner* — Jerry L Brooks
(74) *Attorney, Agent, or Firm* — Marshall, Gerstein & Borun LLP

(57) ABSTRACT

A display system and method are provided. The display system includes a light source device, an optical processing assembly, a reflection device, a light modulator and a controller. The light source device is configured to emit a plurality of light beams; the optical processing assembly is configured to perform a light path adjustment on each light beam from the light source device in such a manner that the light beam irradiates on the reflection device at a preset light-cone angle; the reflection device is configured to reflect the light beams from the optical processing assembly to the light modulator; the controller is connected to the light source device and the light modulator, and is configured to (Continued)

control a light emission state of the light source device; and the light modulator is configured to modulate the light beams through respective controllable units, so as to emit desired display light.

16 Claims, 3 Drawing Sheets

(52) U.S. Cl.
CPC ......... *G03B 21/20* (2013.01); *G03B 21/2013* (2013.01); *G03B 21/2033* (2013.01); *G03B 21/2066* (2013.01)

(58) Field of Classification Search
USPC .......................................................... 353/94
See application file for complete search history.

(56) References Cited

U.S. PATENT DOCUMENTS

| | | | |
|---|---|---|---|
| 2006/0146297 A1 | 7/2006 | Lee | |
| 2011/0222023 A1* | 9/2011 | Okuda | G03B 21/208 |
| | | | 353/30 |
| 2014/0028985 A1* | 1/2014 | Janssens | G02B 27/0955 |
| | | | 353/31 |
| 2015/0286118 A1 | 10/2015 | Park et al. | |
| 2018/0196335 A1* | 7/2018 | Kato | G09G 3/20 |

FOREIGN PATENT DOCUMENTS

| | | | | |
|---|---|---|---|---|
| CN | 101109488 A | 1/2008 | | |
| CN | 102269920 A | 12/2011 | | |
| CN | 105334687 A | 2/2016 | | |
| EP | 1263222 A2 * | 12/2002 | ........... | H04N 9/3141 |
| EP | 2670144 A1 | 12/2013 | | |

OTHER PUBLICATIONS

International Search Report for International Application No. PCT/CN2017/082409, dated Jul. 27, 2017.

Written Opinion for International Application No. PCT/CN2017/082409, dated Jul. 27, 2017.

* cited by examiner

DISPLAY SYSTEM AND METHOD

CROSS-REFERENCE TO RELATED APPLICATIONS

The present application is based on International Application No. PCT/CN2017/082409 filed Apr. 28, 2017, which claims priority to Chinese Patent Application No. 201610519561.1, filed on Jul. 4, 2016, the entire contents of each of which are incorporated herein by reference.

TECHNICAL FIELD

The present disclosure relates to the field of projection and display, and in particular, to a display system and a method.

BACKGROUND

The existing display mainly includes a light source, a first photoelectric modulator, an imaging system, a second photoelectric modulator, a projection screen, etc. Based on an image signal, two photoelectric modulators are required to control a light beam, resulting in a complex structure and error-prone situations.

SUMMARY

Technical Problem to be Solved

For some designs in the display device, an internal reflection prism is used to change a propagation direction of light. Since the internal reflection prism has a large light-cone angle when being spread, the resulting spherical aberration and the astigmatism will cause a large difference in dispersion degrees of light spots on the photoelectric modulator. This may result in distortion and color deviation, poor color uniformity and poor quality of image display during the system imaging.

Solution to the Problem

In a first aspect of the present disclosure, a display system is provided. The display system includes: a light source device; an optical processing assembly; a reflection device; and a light modulator. The light source device is configured to emit a plurality of light beams. The optical processing assembly is configured to perform a light path adjustment on each light beam of the plurality of light beams from the light source device in such a manner that the light beam irradiates on the reflection device at a preset light-cone angle. The reflection device is configured to reflect the plurality of light beams from the optical processing assembly to the light modulator. The light modulator includes a plurality of sets of controllable units. The reflection device is adopted to make the light beam reflected by itself illuminates on a set of controllable units. The light modulator is configured to modulate the light beam by each controllable unit, so as to emit desired display light.

In a second aspect of the present disclosure, a display method is provided. The display method includes:
controlling the array of solid-state light sources to emit light, and controlling each solid-state light source in the array of solid-state light sources to modulate intensity of a light beam emitted from the solid-state light source; and
controlling a flip angle/duration of one or more controllable units of the set of controllable units corresponding to the solid-state light source, thereby controlling intensity of the light beam emitted from the set of controllable units.

Advantageous Effect

In the present disclosure, by simultaneously controlling at the array of solid-state light sources end and at the spatial light modulator end, the laser beam emitted from the array of solid-state light sources is further modulated in the spatial light modulator, thereby emitting display light for generating a more approximate desired image. This can avoid errors that easily occur. By designing a preset angle of inclination, the difference in dispersion degrees of the light spots on the spatial light modulator can be reduced, thereby reducing the distortion and color deviation in imaging of the display system, and thus improving the imaging quality and the display effect of the image.

DESCRIPTION OF EMBODIMENTS

The present disclosure will be further described in the following with reference to the accompanying drawings and embodiments.

Embodiment 1

Figure 1:
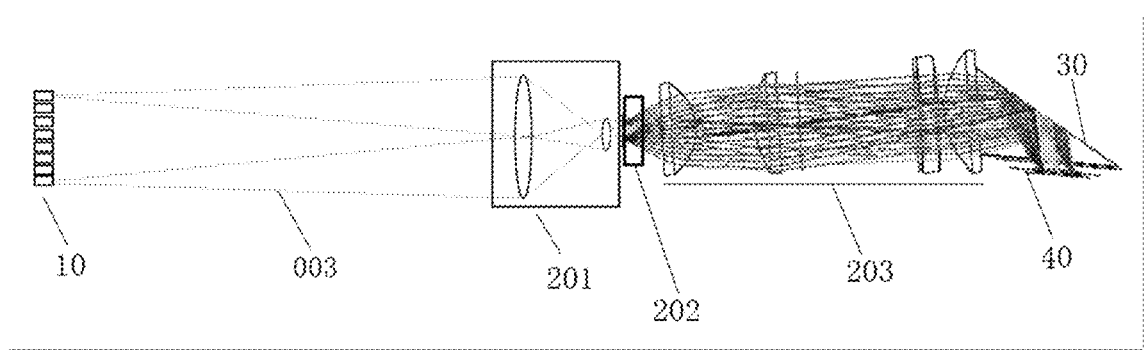
FIG. 1 is a schematic structural diagram of a display system according to Embodiment 1 of the present disclosure.

As shown in FIG. 1, in this embodiment, a display system includes a light source device 10, an optical processing assembly, a reflection device 30, a spatial light modulator 40, a controller, and a screen. The controller is respectively connected to the light source device 10 and the spatial light modulator 40. The optical processing assembly includes a set of first relay lenses 201, a light-homogenized rod unit 202 and a set of second relay lenses 203.

The light source device 10 is an array of solid-state light sources for emitting a plurality of light beams. The spatial light modulator 40 includes a plurality of controllable units, i.e., pixel units. Each solid-state light source of the light source device 10 emits a light beam corresponding to a set of pixel units of the spatial light modulator 40. It should be noted that the solid-state light source includes a laser device and a LED. Unless otherwise specified, the laser device and array of laser devices will be described by way of an example in the following.

The principle of the display system according to the present embodiment generating display light will be described in the following.

The controller first receives a control signal, which may be information on each pixel in one frame of image. The controller controls each laser device in the array of laser devices 10 to emit light in accordance with the control signal. The light emitted from each laser device has an independent state. For example, each laser device can be controlled to turn on or turn off based on the control signal, or each laser device can emit laser beams having different light intensities or brightness based on the control signal. In other embodiments of the present disclosure, the light source device can also be designed as a single laser source with a light modulator. Each controllable unit of the light modulator separately modulates the laser that irradiates on it based on the control signal, until the laser emitted from the laser source is decomposed into light beams of different states.

Figure 2:
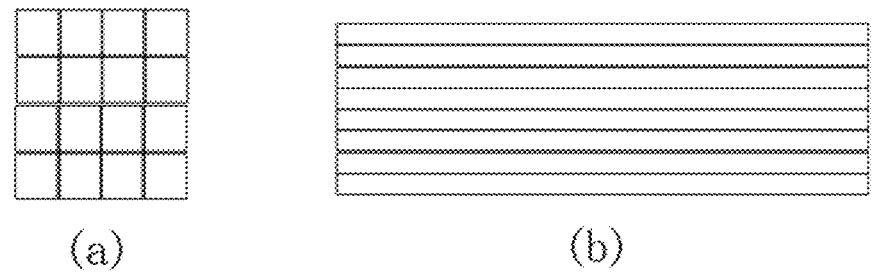
FIG. 2 is a schematic structural diagram of a rectangular light-homogenized rod of a display system according to Embodiment 1 of the present disclosure.

The array of laser devices 10 emits each laser beam to the set of first relay lenses 201. In practical applications, considering dimensions of optical elements in the display system, laser beams emitted from the array of laser devices 10 diverge to some extent and cannot be regarded as pure light. Correspondingly, the laser beam emitting from the optical processing assembly is in a light-cone state with a light-cone angle. The set of first relay lenses 201 is used to converge the light beams to the light-homogenized rod unit 202. In this embodiment, the light-homogenized rod unit 202 is in a form a rectangular array of light-homogenized rods as shown in FIG. 2, which is more advantageous for performing homogenization on each light beam from the set of first relay lenses 201 and then transmitting the light beam to the set of second relay lenses 203. FIG. 2(a) is a front view of rectangular light-homogenized rods, and FIG. 2(b) is a side view thereof. Each laser device in the array of laser devices 10 corresponds to a respective one light-homogenized rod of the array of light-homogenized rods 202, and the laser device and the light-homogenized rod correspond to a respective set of pixel units of the spatial light modulator 40. The set of second relay lenses 203 can adopt a classic TRP (tilt & roll pixel) illumination light path. The set of second relay lenses 203 can be formed by a combination of different lenses, and a purpose of its design is to adjust each light beam from the light-homogenized rod unit 202 in such a manner that each beam can irradiate on the reflection device 30 at a preset light-cone angle. Herein, the preset light-cone angle is 34° or smaller. Preferably, the preset light-cone angle ranges from 16° to 34°. For example, in this embodiment, after a series of transmission and refraction in the set of second relay lenses 203, the light beam irradiates on the reflection device 30 at a preset light-cone angle of 34°. Herein, the angle of 34° is based on the principle of optical design, and is related to a flip angle of the controllable unit of the spatial light modulator 40 and can be adapted to optical elements based on actual needs. In this embodiment, the spatial light modulator 40 preferably adopts a light-cone angle of 34°, and if it is larger than 34°, the optical efficiency and the imaging quality will be influenced. Those skilled in the art can design various optical processing assemblies in combination with conventional technical measures, without limitation to the structure in FIG. 1, as long as the light-cone angle of the light emitted to the reflection device 30 is 34°.

Figure 3:
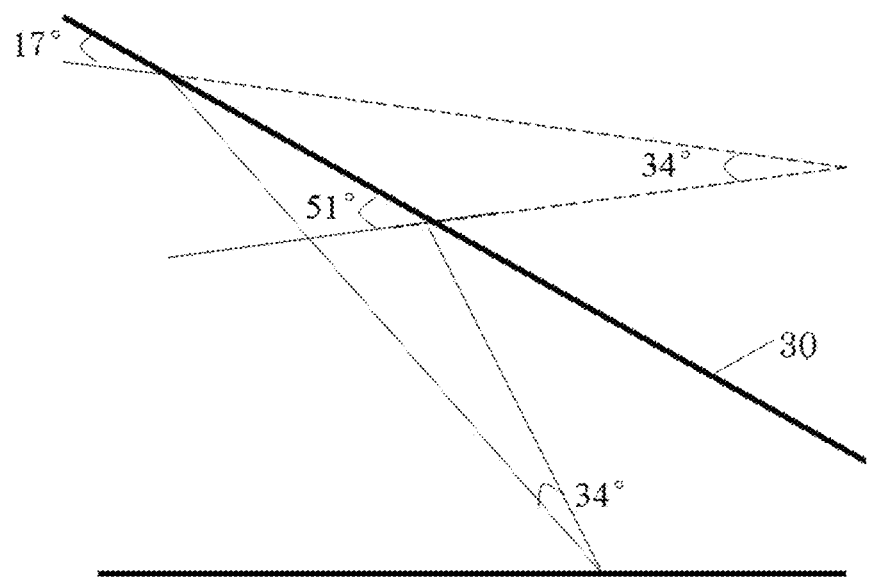
FIG. 3 is a schematic diagram of a light-cone angle in a display system according to Embodiment 1 of the present disclosure.

In this embodiment, as shown in FIG. 3, the reflection device 30 can adopt a total internal reflection mirror, which is configured in such a manner that an angle between a light-cone of a light beam from the optical processing assembly and a light-exiting surface of the total internal reflection mirror is in a range of 17°-51° (sharp angles). In other embodiments of the present disclosure, considering an overall design for the display system, the angle between the light-cone of the light beam and the light-exiting surface of the total internal reflection mirror can be in another range, depending on a different light-cone angle of the light beam.

Figure 4:
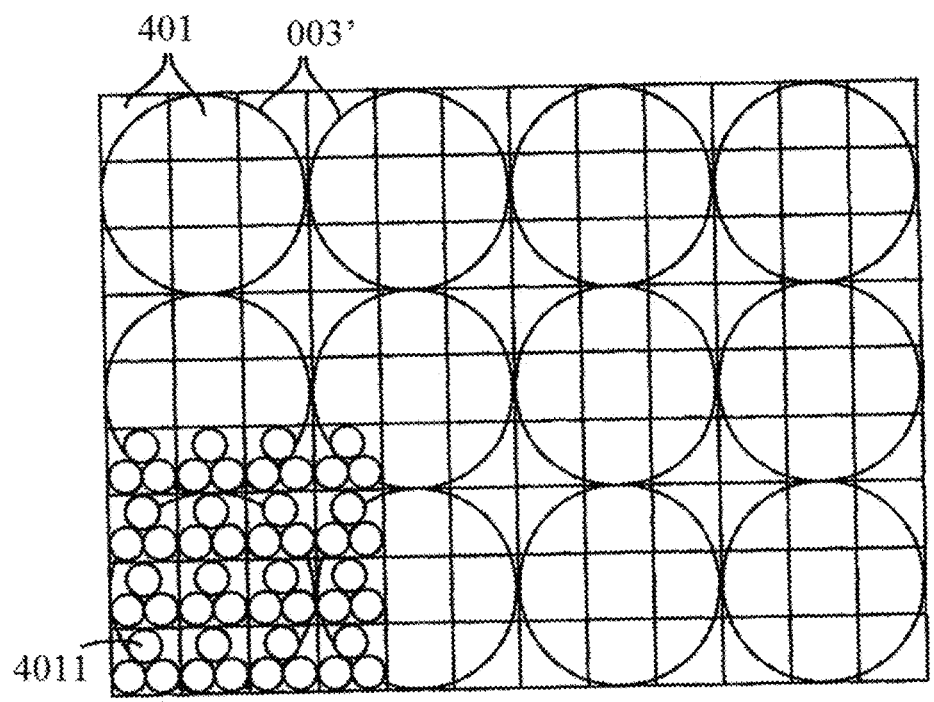
FIG. 4 is a diagram illustrating a correspondence between irradiation ranges of light-cone and pixel units on a spatial light modulator according to Embodiment 1 of the present disclosure.

In this embodiment, the pixel unit of the spatial light modulator 40 (SLM) can be achieved by a technique such as a transmittance-variable display device, a liquid crystal display device, or a digital mirror/micromirror device (DMD). FIG. 4 is a schematic plan view of a spatial light modulator 40. The spatial light modulator 40 includes a plurality of independently addressable pixel units 401 (or DMD lenses). An irradiation area 001' of each light-cone reflected by the reflection device 30 corresponds to one set of pixel units. A set of pixel units includes one or more pixel units. The array of laser devices 10 is in a one-to-one mapping relationship with a working surface of the DMD that is equally divided into hundreds of parts. When the controller uses a control signal to control a laser device in the array of laser devices 10 to emit laser 003, the control signal is also used to control nine pixel units 401 corresponding to an irradiation area 003'. The nine pixel units 401 respectively correspond to individual signal values. For example, the nine pixel units 401 are controlled to have individual deflection angles or individual durations, so that light passing through each pixel unit 401 has a different brightness, light amount, or a transmittance, etc. The irradiation area 003' is formed by the laser 003 passing through the reflection device 30. One pixel unit 401 may further include independently addressable sub-pixel units 4011, which may be associated with, for example, a particular color such as red, green, and blue. Those skilled in the art can also use other conventional technical measures to simultaneously control at the array of laser devices 10 end and at the spatial light modulator 40 end, so that the laser beam emitted from the array of laser devices 10 can be further modulated in the spatial light modulator 40. An original image can be obtained by only the array of laser devices 10, and display light that is more approximate to the desired image can be obtained through further modulation by the spatial light modulator 40. This can ensure a sufficient dark image occurring in a dark area outside the area with the maximum brightness in the image, so that the dark image has a more delicate and rich image level, and thus the viewer can have a better visual experience when the display light is projected onto the screen and imaged.

The optical path control principle of this embodiment will be briefly summarized as follows. The array of laser devices 10 emits light beams, and each laser device corresponds to one light-homogenized rod in the array of light-homogenized rods 202 and corresponds to a set of DMD lenses. In this embodiment, the intensity of the light beam emitted from each laser device can be modulated by controlling the laser device, and the intensity of the light beam incident on the set of DMD lenses corresponding to the laser device is controlled by controlling the flip angle/duration of some or all of the DMD lenses of the set of DMD lenses, so that the light beam is reflected to the lens. That is, the laser device and the set of DMD lenses are controlled in series, and the light beam is controlled both at the laser device end and at the DMD lens end.

Figure 5:
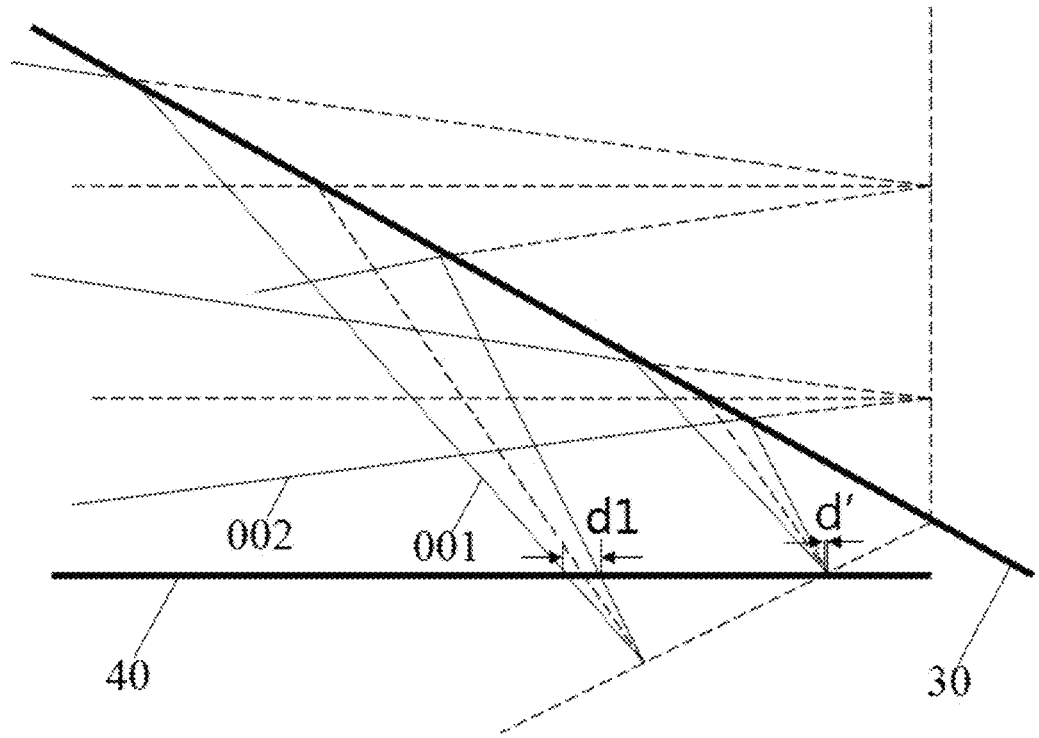
FIG. 5 is a schematic diagram of light-cones irradiating a spatial light modulator in a display system according to the related art.
Figure 6:
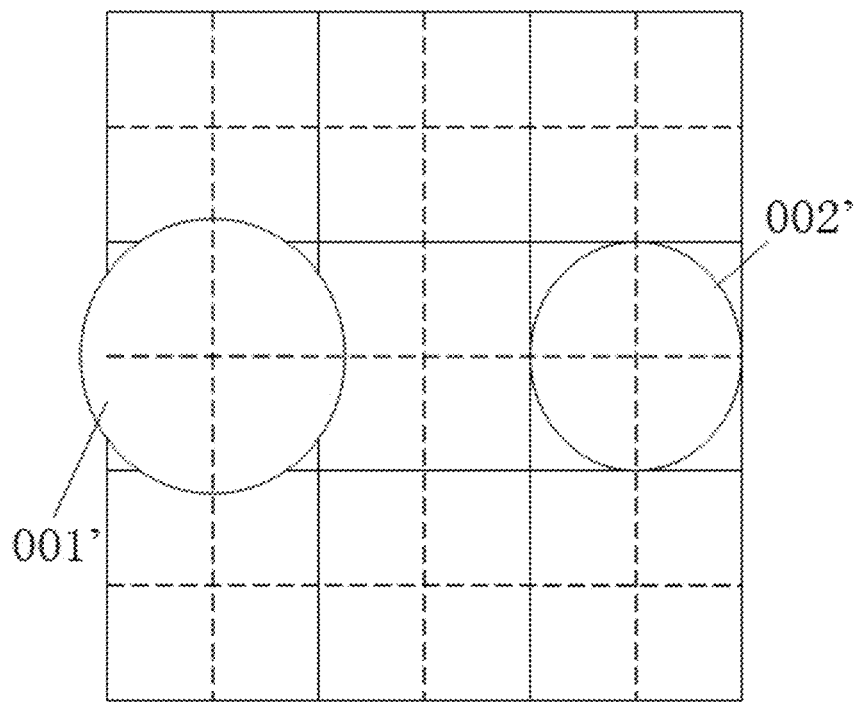
FIG. 6 is a schematic diagram illustrating a difference in dispersion degrees of light spots on a spatial light modulator in a display system according to the related art.

A direction of a central axis between the light source device 10 and the set of first relay lenses 201 is a first direction, and a direction of a central axis between the lenses in the set of second relay lenses 203 is a second direction. As shown in FIG. 5, for the display system in the related art, both the first direction and the second direction each are generally designed as a horizontal direction. A surface of the spatial light modulator 40 for receiving the light is also in the horizontal direction. For example, two light beams, i.e., a first light-cone 001 and a second light-cone 002, are emitted from the set of second relay lenses 203, and a light axis direction of the first light-cone 001 and a light axis direction of the second light-cone 002 are also the horizontal direction. After the first light-cone 001 and the second light-cone 002 are reflected by the reflection device 30, an apexes of the light-cones (which can be considered to have a diameter d') are not all exactly in the horizontal line. As shown in FIG. 6, considering the second light-cone 002 as an ideal case, an irradiation area 002' on the spatial light modulator 40 formed by the second light-cone 002 overlaps exactly with a set of pixel units, and its diameter is d'. An irradiation area 001' on the spatial light modulator 40 formed by the first light-cone 001 is larger, and its diameter d1 is beyond the area of a set of pixel units. Therefore, this phenomenon of the display system in the related art causes a large difference in dispersion degrees of many light spots (i.e., the irradiation areas), which affects controlling the light by the spatial light modulator 40, and reduces the imaging quality.

Figure 7:
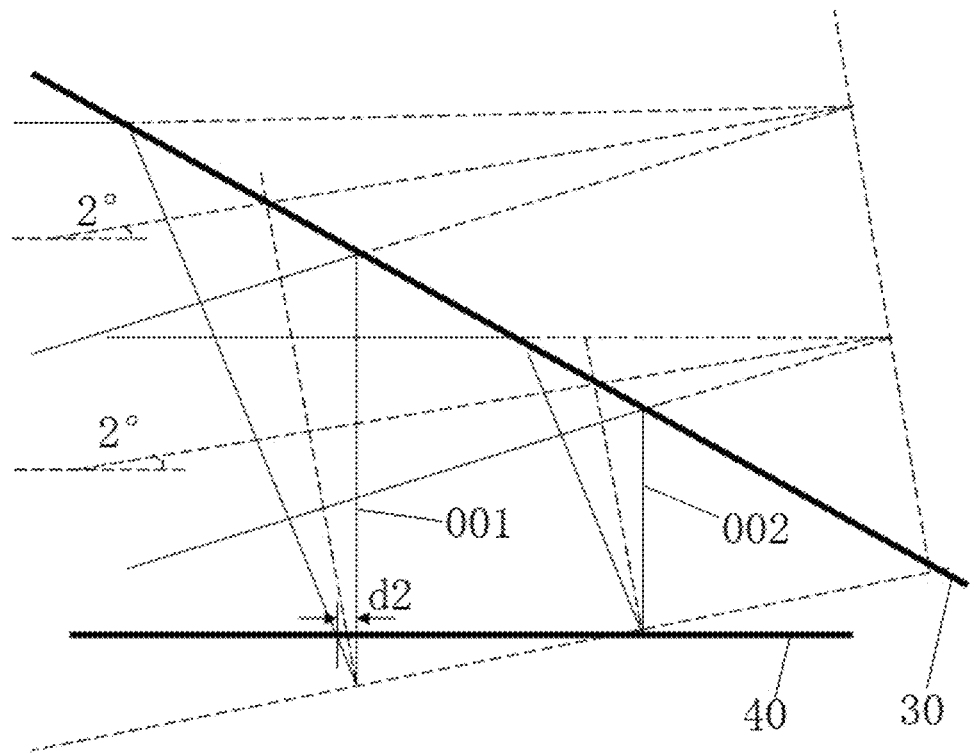
FIG. 7 is a schematic diagram of light-cones irradiating a spatial light modulator in a display system according to Embodiment 1 of the present disclosure.

As shown in FIG. 7, in this embodiment, the array of laser devices 10 is tilted upward by a preset angle of inclination relative to the horizontal direction, for example, the array of laser devices 10 is tilted upward by 2°-3°. That is, the first direction is a direction tilted upward by 2°-3° relative to the horizontal direction, and the second direction is the horizontal direction. Then, the first light-cone 001 and the second light-cone 002 irradiate on the reflection device 30, the direction of the light axis of the first light-cone 001 and the direction of the light axis of the second light-cone 002 are also tilted upward by 2°-3° relative to the horizontal direction. After the first light-cone 001 and the second light-cone 002 are reflected onto the spatial light modulator 40, considering the second light-cone 002 as an ideal case, an irradiation area on the spatial light modulator 40 formed by the second light-cone 002 overlaps exactly with a set of pixels. A diameter of an irradiation area on the spatial light modulator 40 formed by the first light-cone 001 is d2. It can be clearly seen that d2 is smaller than d1. In other words, compared with the related art, the display system in this embodiment has a smaller or negligible difference in dispersion degrees of the light spots on the photoelectric modulator 40, and the imaging quality is improved. In other embodiments of the present disclosure, the direction of the central axis between the lenses in the set of second relay lenses 203, i.e., the second direction, may be tilted upward by a preset angle with respect to the horizontal direction, and the first direction is the horizontal direction; or the direction of the central axis between the lenses in the optical processing assembly may be tilted upward by a preset angle with respect to the horizontal direction, and the first direction is the horizontal direction; or both the first direction and the second direction are tilted upward by a preset angle, so that the direction of the light axis of the first light-cone 001 and the direction of the light axis of the second light-cone 002 are tilted upward by a preset angle relative to the horizontal direction. Moreover, the preset angle may be tilted upward relative to the horizontal direction or may be tilted downward relative to the horizontal direction, depending on the actual configuration of the display system. When the display system as a whole is not horizontally but vertically disposed, the first direction or the second direction can be offset from the vertical direction by a preset angle, so that the direction of the light axis of the first light-cone 001 and the direction of the light axis of the second light-cone 002 are offset from the vertical direction by a preset angle. In this way, compared with the related art, the display system in this embodiment can have a smaller difference in dispersion degrees of the light spots on the photoelectric modulator 40, and the imaging quality and the display effect of the image can be improved.

The display system and the display method of the present disclosure can be used in the field of High-Dynamic Range (HDR) digital imaging and projection display technologies, for example, in a Digital Light Procession (DLP) projector using TRP illumination. By simultaneously controlling at the array of laser devices 10 end and at the spatial light modulator 40 end, the laser source can be switched and modulated at a high speed so that each laser source can achieve a function of the first photoelectric modulator, and the laser beam emitted from the array of laser devices 10 can be further modulated at the spatial light modulator 40. That is, the HDR function can be achieved by separately controlling each laser device and the DMD local area mapped thereto, thereby emitting display light for generating a more approximate desired image. In this way, the viewer can have a better visual experience when the display light is projected onto the screen. At the same time, compared with the related art in which two spatial light modulators are used, the present disclosure uses only one spatial light modulator, which not only simplifies the light path structure, but also avoids errors that are easily caused by controlling two spatial light modulators. In this way, it is more in line with the interests of the users, and it can ensure a sufficient dark image occurring in a dark area outside the area with the maximum brightness in the image, so that the dark image has a more delicate and rich image level, and thus the viewer can have a better visual experience. Moreover, with the present disclosure, the problem of a large difference in dispersion degrees of the light spots on the spatial light modulator in the conventional display system is solved, thereby reducing the distortion and color deviation in the imaging of the display system. As a result, the brightness and the color are more uniform, and the image is more similar to the object, thereby improving the imaging quality and the display effect of the image. The solution of these problems can allow the technician to design a more detailed mapping relationship in the DMD working surface, and provide a better hardware support for achieving the HDR function. The present disclosure does not require any addition optical element or light modulator while achieving significant improvements by using the cost and condition in the related art, so the present disclosure is of great significance to the developers, manufacturers and users of display systems.

The present disclosure has been described above with reference to specific examples, which are merely used to illustrate the present disclosure and are not intended to limit the present disclosure. Those skilled in the art can make several simple derivations or substitutions based on the concept of the present disclosure.

What is claimed is:
1. A display system, comprising:
a light source device;
an optical processing assembly;
a reflection device;
and a light
modulator, wherein the light source device is configured to emit a plurality of light beams, the optical processing assembly is configured to perform a light path adjustment on each light beam of the plurality of light beams from the light source device in such a manner that the light beam irradiates on the reflection device at a preset light-cone angle, the reflection device is configured to reflect the plurality of light beams from the optical processing assembly to the light modulator, and the light modulator comprises a plurality of sets of controllable units, each light beam reflected by the reflection device corresponds to a respective set of the plurality of sets of controllable units, and the light modulator is configured to control one or more controllable units in the respective set of controllable units to modulate the light beam corresponding to the set of controllable units, so as to emit desired display light, wherein the optical processing assembly comprises a set of first relay lenses, a light-homogenized rod unit and a set of second relay lenses, wherein the set of first relay lenses is configured to converge the plurality of light beams from the light source device to the light-homogenized rod unit, the light-homogenized rod unit is configured to perform homogenization on each light beam from the set of first relay lenses and transmit the light beam to the set of second relay lenses, and the set of second relay lenses is configured to adjust each light beam from the light-homogenized rod unit such that each light beam is irradiated on the reflection device in a preset light-cone angle, wherein a central axis direction between the light source device and the set of first relay lenses is a first direction, a central axis direction between lenses of the set of second relay lenses is a second direction, and the first direction and the second direction are offset from each other by a preset angle of inclination, in such a manner that a light axis direction of the light beam that irradiates on the reflection device at the preset light-cone angle and a surface of the light modulator for receiving the light beam are offset from each other by the preset angle of inclination.

2. The display system according to claim 1, wherein the light source device comprises an array of solid-state light sources configured to emit a plurality of laser beams, and a laser beam emitted from each solid-state light source in the array of solid-state light sources corresponds to one set of the plurality of sets of controllable units of the light modulator.

3. The display system according to claim 2, further comprising:
a controller connected to the light source device and the light modulator,
wherein the controller is configured to receive a control signal, control a light emission state of a solid-state light source in the array of solid-state light sources in accordance with the control signal, and control a modulation state of one or more controllable units of the set of controllable units corresponding to the solid-state light source, such that the light modulator modulates the light beam emitted from the solid-state light source and emit desired display light in accordance with the control signal.

4. The display system according to claim 1, wherein the light-homogenized rod unit is a rectangular array of light-homogenized rods, and each light source in the array of solid-state light sources is in one-to-one correspondence to a respective light-homogenized rod of the array of light-homogenized rods, and the solid-state light source and the light-homogenized rod correspond to a respective set of controllable units of the light modulator.

5. The display system according to claim 1, wherein the preset light-cone angle is in a range of 16°-34°.

6. The display system according to claim 1, wherein the reflection device is disposed in such a manner that an angle between a light beam in a form of a light-cone from the optical processing assembly and a light-exiting surface of the reflection device is in a range of 17°-51°.

7. The display system according to claim 1, further comprising a projection screen configured to receive display light from the light modulator so as to display an image.

8. The display system according to claim 1, wherein the first direction and the second direction are offset from each other by 2°-3°.

9. The display system according to claim 1, wherein the first direction is a horizontal/vertical direction, and the second direction is offset from the horizontal/vertical direction by the preset angle of inclination; or the second direction is a horizontal/vertical direction, and the first direction is offset from the horizontal/vertical direction by the preset angle of inclination.

10. A display method, using the display system according to claim 1 wherein the display method comprises:
controlling the array of solid-state light sources to emit light, and controlling each solid-state light source in the array of solid-state light sources to modulate intensity of a light beam emitted from the solid-state light source; and
controlling a flip angle/duration of one or more controllable units of the set of controllable units corresponding to the solid-state light source, thereby controlling intensity of the light beam emitted from the set of controllable units.

11. The display system according to claim 2, wherein the light-homogenized rod unit is a rectangular array of light-homogenized rods, and each light source in the array of solid-state light sources is in one-to-one correspondence to a respective light-homogenized rod of the array of light-homogenized rods, and the solid-state light source and the light-homogenized rod correspond to a respective set of controllable units of the light modulator.

12. The display system according to claim 2, wherein the preset light-cone angle is in a range of 16°-34°.

13. The display system according to claim 2, wherein the reflection device is disposed in such a manner that an angle between a light beam in a form of a light-cone from the optical processing assembly and a light-exiting surface of the reflection device is in a range of 17°-51°.

14. The display system according to claim 2, further comprising a projection screen configured to receive display light from the light modulator so as to display an image.

15. The display system according to claim 2, wherein the first direction and the second direction are offset from each other by 2°-3°.

16. The display system according to claim 2, wherein the first direction is a horizontal/vertical direction, and the second direction is offset from the horizontal/vertical direction by the preset angle of inclination; or the second direction is a horizontal/vertical direction, and the first direction is offset from the horizontal/vertical direction by the preset angle of inclination.

* * * * *